(12) United States Patent
Krueckels et al.

(10) Patent No.: US 11,353,214 B2
(45) Date of Patent: Jun. 7, 2022

(54) GAS TURBINE

(71) Applicant: ANSALDO ENERGIA SWITZERLAND AG, Baden (CH)

(72) Inventors: Joerg Krueckels, Birmenstorf (CH); Marc Henze, Wettingen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 346 days.

(21) Appl. No.: 15/205,886

(22) Filed: Jul. 8, 2016

(65) Prior Publication Data
US 2017/0009990 A1   Jan. 12, 2017

(30) Foreign Application Priority Data
Jul. 10, 2015   (EP) .................................. 15176243

(51) Int. Cl.
| | |
|---|---|
| *F23R 3/16* | (2006.01) |
| *F01D 25/12* | (2006.01) |
| *F23R 3/00* | (2006.01) |
| *F01D 9/02* | (2006.01) |
| *F02C 3/32* | (2006.01) |

(52) U.S. Cl.
CPC ............... *F23R 3/16* (2013.01); *F01D 9/023* (2013.01); *F01D 25/12* (2013.01); *F02C 3/32* (2013.01); *F23R 3/005* (2013.01); *F05B 2220/302* (2013.01); *F05D 2240/35* (2013.01); *F05D 2250/38* (2013.01); *F05D 2260/202* (2013.01); *F23R 2900/03042* (2013.01)

(58) Field of Classification Search
CPC .............. F23R 3/16; F23R 2900/03045; F23R 2900/03044; F23R 2900/03043; F23R 2900/03042; F23R 2900/03041; F01D 25/12; F01D 9/023; F02C 7/12
See application file for complete search history.

(56) References Cited

U.S. PATENT DOCUMENTS

| | | | | |
|---|---|---|---|---|
| 3,959,966 | A * | 6/1976 | Pearce | F01D 9/023 60/796 |
| 5,711,650 | A * | 1/1998 | Tibbott | F01D 5/186 415/115 |
| 6,082,961 | A * | 7/2000 | Anderson | F01D 5/08 415/115 |
| 10,024,169 | B2 * | 7/2018 | Bunker | F01D 5/186 |
| 2006/0078417 | A1 * | 4/2006 | Benton | F01D 9/023 415/115 |

(Continued)

FOREIGN PATENT DOCUMENTS

EP   2 248 996 A   11/2010

OTHER PUBLICATIONS

Wikipedia webpage. https://en.wikipedia.org/wiki/Coand%C4%83_effect (2021).*

(Continued)

*Primary Examiner* — Todd E Manahan
*Assistant Examiner* — Rodolphe Andre Chabreyrie
(74) *Attorney, Agent, or Firm* — Buchanan Ingersoll & Rooney PC

(57) ABSTRACT

The present invention relates to a gas turbine implemented for example at the interface between the combustor and the vane platform. An efficiency of a cooling film associated to the vane platform can be increased, hence reducing the quantity of the air needed.

12 Claims, 3 Drawing Sheets

(56) References Cited

U.S. PATENT DOCUMENTS

| | | | | |
|---|---|---|---|---|
| 2007/0095067 A1* | 5/2007 | Alkabie | ................. | F01D 9/023 |
| | | | | 60/772 |
| 2007/0227119 A1 | 10/2007 | Alkabie | | |
| 2008/0131263 A1* | 6/2008 | Lee | ......................... | F01D 11/10 |
| | | | | 415/115 |
| 2009/0077977 A1* | 3/2009 | Cayre | ....................... | F23R 3/06 |
| | | | | 60/757 |
| 2010/0278644 A1* | 11/2010 | Gersbach | ................ | F01D 5/143 |
| | | | | 415/208.2 |
| 2016/0153281 A1* | 6/2016 | Barr | ......................... | F23R 3/06 |
| | | | | 415/116 |

OTHER PUBLICATIONS

European Search Report dated Jan. 8, 2106, by the European Patent Office for Application No. 15176243.2.

* cited by examiner

GAS TURBINE

TECHNICAL FIELD

The present invention relates to a gas turbine. In particular the present invention relates to a novel design of the gas turbine implemented at the interface between the combustor and the vane platform.

BACKGROUND

As well known, gas turbines have combustion chambers wherein a fuel is combusted to generate a hot gas flow to be expanded in one or more expansion stages of a turbine. Each expansion stage consists of a plurality of stator vanes arranged on an annular vane platform located around a rotating shaft, and a rotor airfoil row arranged integral to the shaft. During operation the hot gas generated in the combustion chamber passes through the stator vanes to be accelerated and turned, and afterwards it passes through the rotor airfoil row to deliver mechanical power to the rotor.

For reasons of assembly, a gap is provided substantially at the transition between the inner wall of the combustion chamber and the first vane platform; through this gap cooling air for cooling the combustion chamber and the stator vane platform is injected into the hot gases path. Furthermore, through the same gap, additional air (purge air) is injected for avoiding hot gases entering into the gaps, which would cause overheating of structural parts adjacent to the gap. In fact, stator vanes generate regions of high static pressure a non-uniform circumferential static pressure distribution resulting in a non-uniform circumferential static pressure distribution upstream the vane platform, which indeed may cause hot gas entering the gaps.

The air injected through the interface gap flows into the hot gas path and provides a cooling film on the vane platform.

Existing solutions provide ways to improve the efficiency of the cooling film, thereby reducing the amount of air needed for the purpose.

In particular, EP2248996 teaches to provide the zone of the vane platform downstream the gap with bumps, circumferentially located in the regions where the static pressure of the hot gas is lowest. The bumps are arranged to locally increase the static pressure of the hot gas flow passing close to them, this way reducing the amount of hot air re-entering into the gaps. However, such solution would require a complex shaping of the platform which is challenging for the manufacturing process and the internal cooling.

SUMMARY OF THE INVENTION

Within the scope of a technical aim according to an exemplary embodiment of the disclosure, an object of the invention is to provide a gas turbine wherein the efficiency of the cooling film associated to the vane platform is increased, hence reducing the quantity of the air needed.

According to an aspect of the invention, this object is obtained by a gas turbine comprising a combustor defined by inner and outer walls, followed by a vane platform defined by inner and outer stator walls, wherein the gas turbine further comprises a gap, arranged between the combustor inner wall and the inner stator wall and between the outer combustor wall and the outer stator wall, the gas turbine further comprising one or more cooling ducts arranged upstream the gap and within the inner and/or outer combustor walls.

According to a preferred aspect of the invention, the cooling ducts are arranged within the inner and/or outer combustor walls such to fluidically connect the combustor with a portion defined between the combustor walls and a combustor liner.

According to a preferred aspect of the invention, the gap is sealed.

According to a preferred aspect of the invention, the cooling ducts are arranged in a side section of the gas turbine with a tilt angle $\alpha$ relative to a rotor axis A, wherein the tilt angle $\alpha$ may be comprised within a range of 5°-40°.

According to a preferred aspect of the invention, tilt angle $\alpha$ may be comprised in a sub-range of 7°-15°.

According to a preferred aspect of the invention, the tilt angle $\alpha$ may substantially be equal to 9° or 10°.

According to a preferred aspect of the invention, the cooling ducts are arranged in a top section of the gas turbine with a tilt angle $\beta$ relative to a rotor axis A, the tilt angle $\beta$ being comprised within a range of 0°-45°.

According to a preferred aspect of the invention, tilt angle $\beta$ may be comprised in a sub-range of 5°-40°.

According to a preferred aspect of the invention, tilt angle $\beta$ may be comprised in a sub-range of 10°-35°.

According to a preferred aspect of the invention, tilt angle $\beta$ may be comprised in a sub-range of 15°-30°.

According to a preferred aspect of the invention, tilt angle $\beta$ may be comprised in a sub-range of 20°-25°.

Preferably, tilt angle $\beta$ has a value which may be substantially equal to 34° or 0°.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which.

A preferred and non-limiting embodiment will be now described in detail with reference to the above referenced drawings.

DETAILED DESCRIPTION OF THE INVENTION

Figure 1:
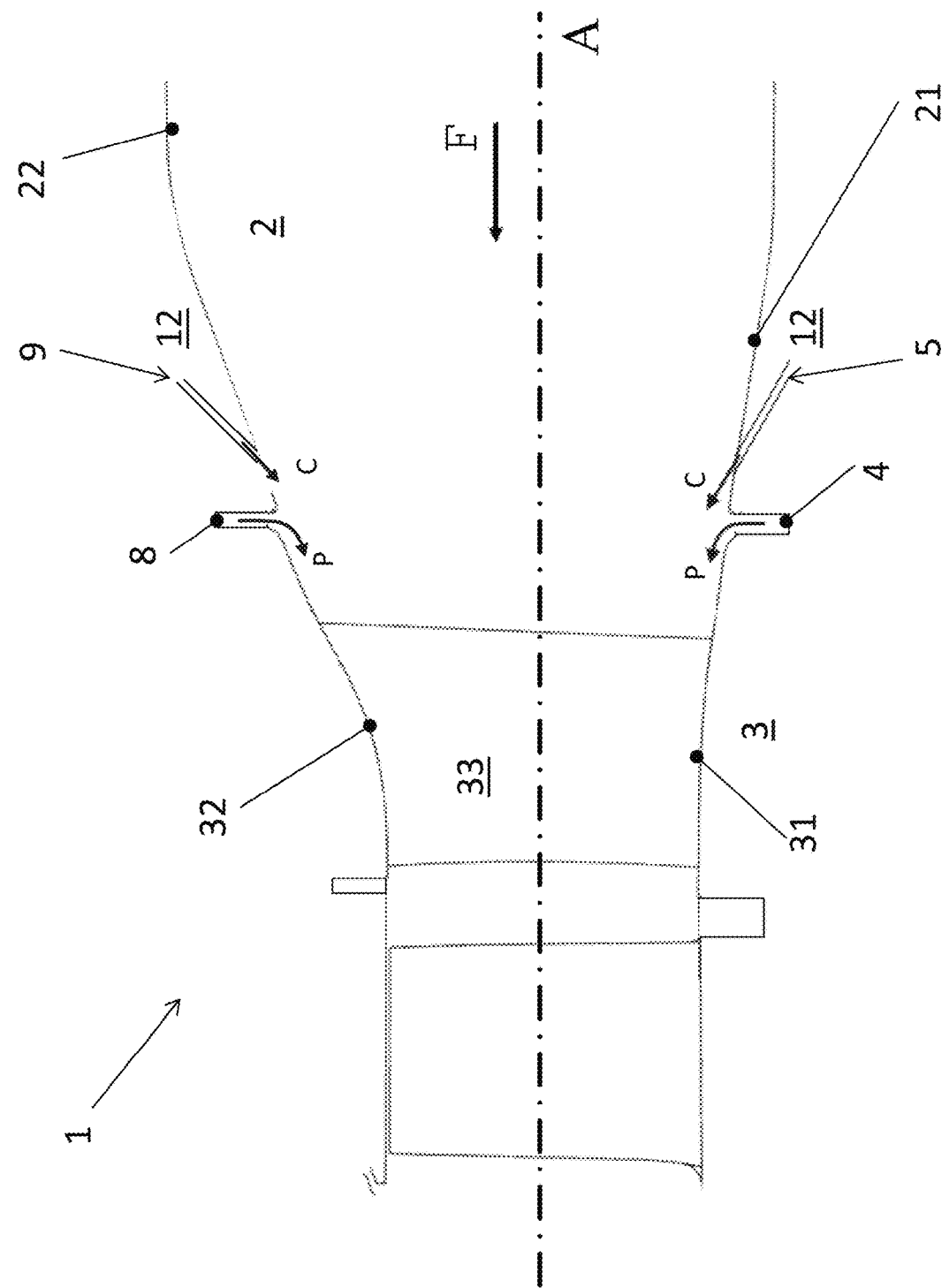
FIG. 1 shows a side section of a gas turbine according to the present invention.

With reference to FIG. 1, it is shown a schematic side sectional view of a gas turbine, generally referred to with numeral reference 1. The gas turbine 1 comprises a combustor 2, which is defined by an inner wall 21 and an outer wall 22 and arranged downstream a compressor (not shown).

In the combustor 2 a flow F of hot gas is energised and is then directed to a stator mounted on a vane platform 3. The vane platform 3 in turn defines an inner stator wall 31 and an outer stator wall 32, on which a first row of stator vanes 33 are mounted for guiding the flow of gas towards a subsequent rotor stage, where the energy conversion process takes place.

Gas turbine 1 further includes an inner gap 4 and an outer gap 8 which are arranged respectively between the inner wall 21 of the combustor and the inner stator wall 31 and between the outer wall 22 of the combustor and the outer stator wall 32. The gaps 4, 8 are typically sealed to limit the amount of air moving from a compressor end (not shown) because of a negative pressure gradient and reaching the flow F of hot gas directed to the stator in correspondence of the gaps 4 and 8. In fact, seals 4 and 8 cannot be completely tight due to relative movements of gas turbine components (such as turbine and combustor) for example during start-up operations and/or different operative regimes of the gas turbine. As a consequence of this, purge air P, usually coming from the compressor end, leaks through gaps 4 and 8 and mixes with the flow F of hot air. This also avoids hot gas entering into the gaps for the reasons explained above. Additionally, leakage/purge air also fulfils a cooling function associated to the vane platform 3.

According to an aspect of the invention, gas turbine 1 further comprises a plurality of cooling ducts 5 which are located upstream the inner gap 4 (relative to the flow of hot gas indicated with arrow F) and within the inner wall 21 of combustor 2.

Alternatively or additionally, gas turbine 1 may also comprise a plurality of cooling ducts 9 which are located upstream outer gap 9 and within the outer wall 22 of the combustor 2.

According to a preferred and non-limiting example, cooling ducts 5 and 9 have a circular cross-section.

Preferably, the cooling ducts are arranged within said inner and/or outer combustor walls 21, 22 such to fluidically connect the combustor 2 with a portion 12 which is defined between the combustor walls 21 and 22 and a combustor liner (not shown).

Advantageously, the cooling air exiting the cooling ducts 5 and/or cooling ducts 9 creates a cooling film, acting on the vane inner wall 31 and/or the outer wall 32, which cooperates with the purge air associated to gaps 4 and/or 8.

This has proven to generate a synergistic effect which significantly improves the overall cooling effect and is such to require a lesser amount of air to be injected with respect to known arrangements.

To maximise the advantageous effects above described, a preferred geometry is described with reference to following FIGS. 2 and 3.

Figure 2:
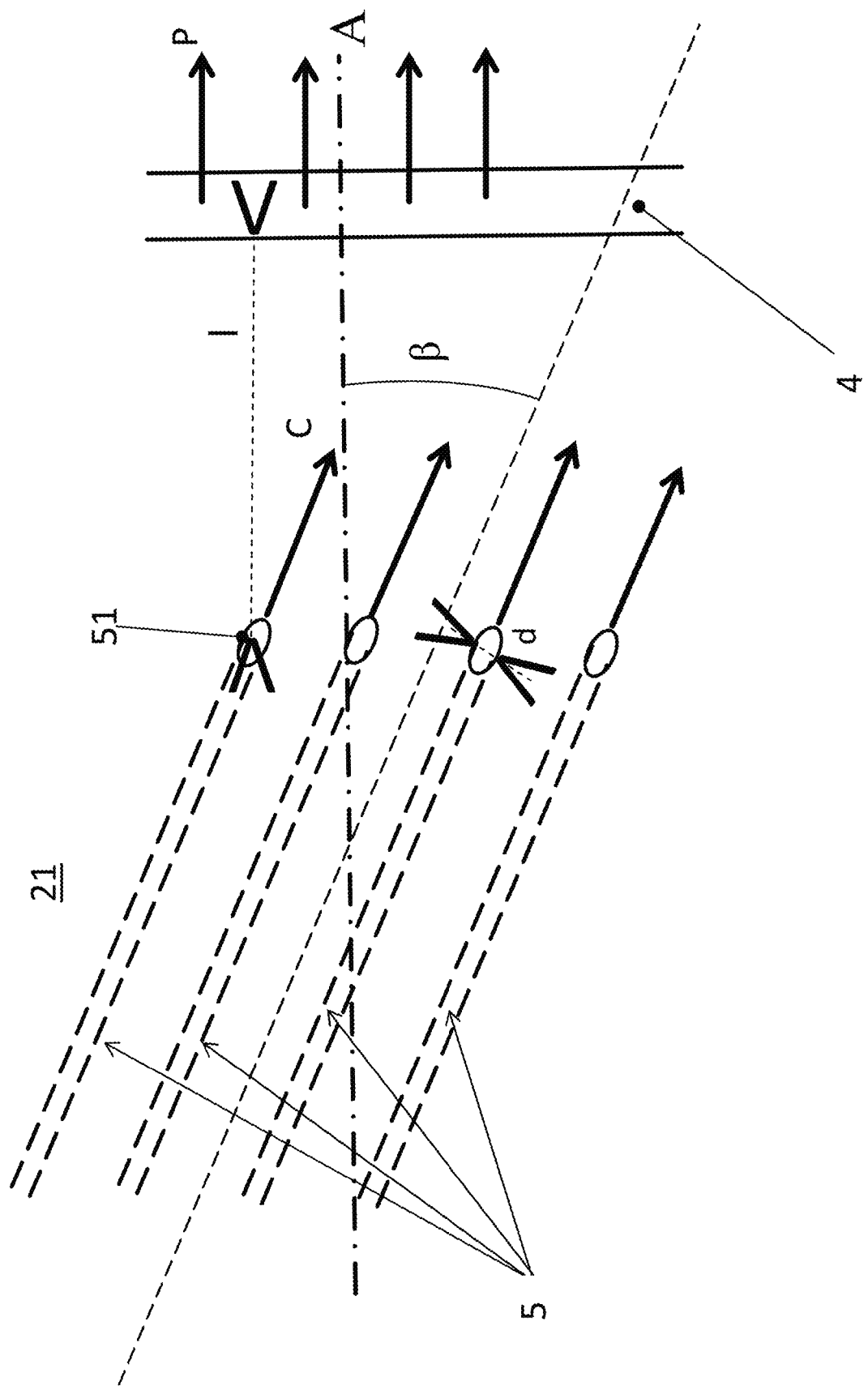
FIG. 2 shows a particular of FIG. 1 in a top section.

With reference to FIG. 2, it is shown the gas turbine 1 according to the invention in a top sectional view. In this view, cooling ducts 5 are arranged with a tilt angle β, relative to a rotor axis A, which may be selected in a range of angles comprised between 0° and 45°. According to preferred embodiments, tilt angle β may be comprised in subsequent sub-ranges: 5°-40°, 10°-35°, 15°-30°, 20°-25°. Preferably, tilt angle β may be substantially equal to 0° or 34°.

The same geometry applies, mutatis mutandis, to cooling ducts 9.

The resulting inclination of the cooling air C exiting the cooling ducts 5 and or cooling ducts 9 determines an optimum merging of the latter with purge air P, coming from the gaps 4 and 8, which improves the overall cooling effect.

Another geometric parameter which has proven to provide an advantageous technical effect is a ratio z of a distance 1, measured along the rotor axis A from the gap 4 to a terminal end 51 of the cooling duct 5 where the duct intercepts inner combustor wall 21, and a diameter d of the duct. Such ratio z may vary within a numerical range 5-40, and has a preferred value substantially equal to 24.

It will be appreciated that such preferred geometry has been described with reference to cooling ducts 5 associated to inner combustor wall 21, but the same geometry may also be advantageously applied to cooling ducts 9 associated to outer combustor wall 22.

Figure 3:
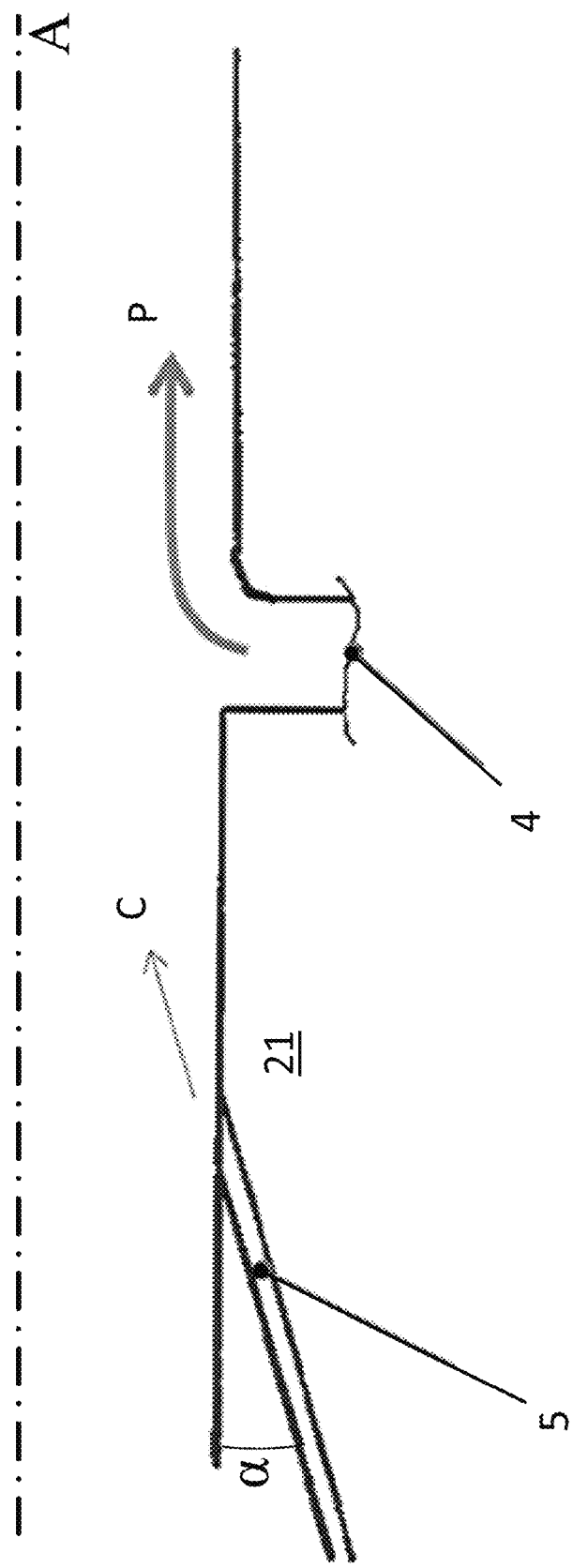
FIG. 3 shows a detail of FIG. 1.

With reference to following FIG. 3, the gas turbine according to the invention is now shown in a side sectional view with reference to inner combustor wall 21, but it will be appreciated that the same geometry applies to outer combustor wall 22 associated to the cooling ducts 9.

In particular, cooling ducts 5 (only one is visible in this view) are inclined of an angle α relative to the rotor axis A. Preferably, angle α is comprised within a range 5°-40° and preferably within the sub-range 7°-15°. According to preferred embodiments, tilt angle α may be equal to approximately 9° or 10°.

It may be appreciated that whilst the gas turbine 1 herein disclosed as a non-limiting exemplary embodiment comprises a plurality of cooling ducts, same advantageous effects may also be reached by providing the gas turbine 1 with only one cooling duct.

In an exemplary embodiment, a gas turbine 1 includes a combustor 2 defined by inner and outer walls 21, 22, followed by a vane platform 3 defined by inner and outer stator walls 31, 32, a gap 4, 8, arranged between the combustor inner wall and the inner stator wall and between the outer combustor wall and the outer stator wall, wherein during operation of the gas turbine, the gap is configured to pass purge air therethrough to create a first cooling film on the vane platform, wherein the gap is defined by mutually facing inner radial wall portions of the inner wall and of the inner stator wall and by mutually facing outer radial wall portions of the outer wall and of the outer stator wall, wherein the inner radial wall portion of the inner stator wall is joined to an inner flow channel wall portion of the inner stator wall by an inner curved portion and wherein the outer radial wall portion of the outer stator wall is joined to an outer flow channel wall portion of the outer stator wall by an outer curved portion, whereby the purge air is deflected by the inner curved portion and by the outer curved portion, and one or more cooling ducts 9 arranged upstream of said gap and within said inner and outer combustor walls, the one or more cooling ducts configured to inject cooling air to create a second cooling film which merges with the first cooling film, wherein a ratio z between a distance I measured along a rotor axis A from the gap to a terminal end of said cooling ducts where the ducts intercept the inner and outer combustor walls, and a diameter d of the cooling ducts, is within a numerical range 5-40, wherein said cooling ducts are arranged in a side section of the gas turbine with a tilt angle α relative to a rotor axis A, said tilt angle α being within a range of 5°-40°.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. Gas turbine comprising:
   a combustor defined by inner and outer walls, followed by a vane platform defined by inner and outer stator walls;
   a gap, arranged between the combustor inner wall and the inner stator wall and between the outer combustor wall and the outer stator wall, wherein during operation of the gas turbine, the gap is configured to pass purge air therethrough to create a first cooling film on the vane platform, wherein the gap is defined by mutually facing inner radial wall portions of the inner wall and of the inner stator wall and by mutually facing outer radial wall portions of the outer wall and of the outer stator wall, wherein the inner radial wall portion of the inner stator wall is joined to an inner flow channel wall portion of the inner stator wall by an inner curved portion and wherein the outer radial wall portion of the outer stator wall is joined to an outer flow channel wall portion of the outer stator wall by an outer curved portion, whereby the purge air is deflected by the inner curved portion and by the outer curved portion; and one or more cooling ducts arranged upstream of said gap and within said inner and outer combustor walls, the one or more cooling ducts configured to inject cooling air to create a second cooling film which merges with the first cooling film, wherein a ratio z between a distance l measured along a rotor axis A from the gap to a terminal end of said cooling ducts where the ducts intercept the inner and outer combustor walls, and a diameter d of the cooling ducts, is within a numerical range 5-40, wherein said cooling ducts are arranged in a side section of the gas turbine with a tilt angle $\alpha$ relative to a rotor axis A, said tilt angle $\alpha$ being within a range of 5°-40°.

2. Gas turbine according to claim 1, wherein said cooling ducts are arranged within said inner and outer combustor walls to fluidically connect said combustor with a portion defined between said combustor walls and a combustor liner.

3. Gas turbine according to claim 2, wherein said gap is sealed for reducing the amount of purge air flowing through the gap.

4. Gas turbine according to claim 1, wherein said tilt angle $\alpha$ is within a sub-range 7° 15°.

5. Gas turbine according to claim 1, wherein said tilt angle $\alpha$ is substantially equal to 9° or 10°.

6. Gas turbine according to claim 1, wherein said cooling ducts are arranged in a top section of the gas turbine with a tilt angle $\beta$ relative to a rotor axis A, said tilt angle $\beta$ being within a range of 0°-45°.

7. Gas turbine according to claim 6, wherein said tilt angle $\beta$ being within a range of 0°-34°.

8. Gas turbine according to claim 6, wherein said tilt angle $\beta$ is within a sub-range 5°-40°.

9. Gas turbine according to claim 8, wherein said tilt angle $\beta$ is within a sub-range 10°-35°.

10. Gas turbine according to claim 9, wherein said tilt angle $\beta$ is within a sub-range 15°-30°.

11. Gas turbine according to claim 10, wherein said tilt angle $\beta$ is within a sub-range 20°-25°.

12. Gas turbine according to claim 1, wherein said ratio z is substantially equal to 24.

* * * * *